UNITED STATES PATENT OFFICE.

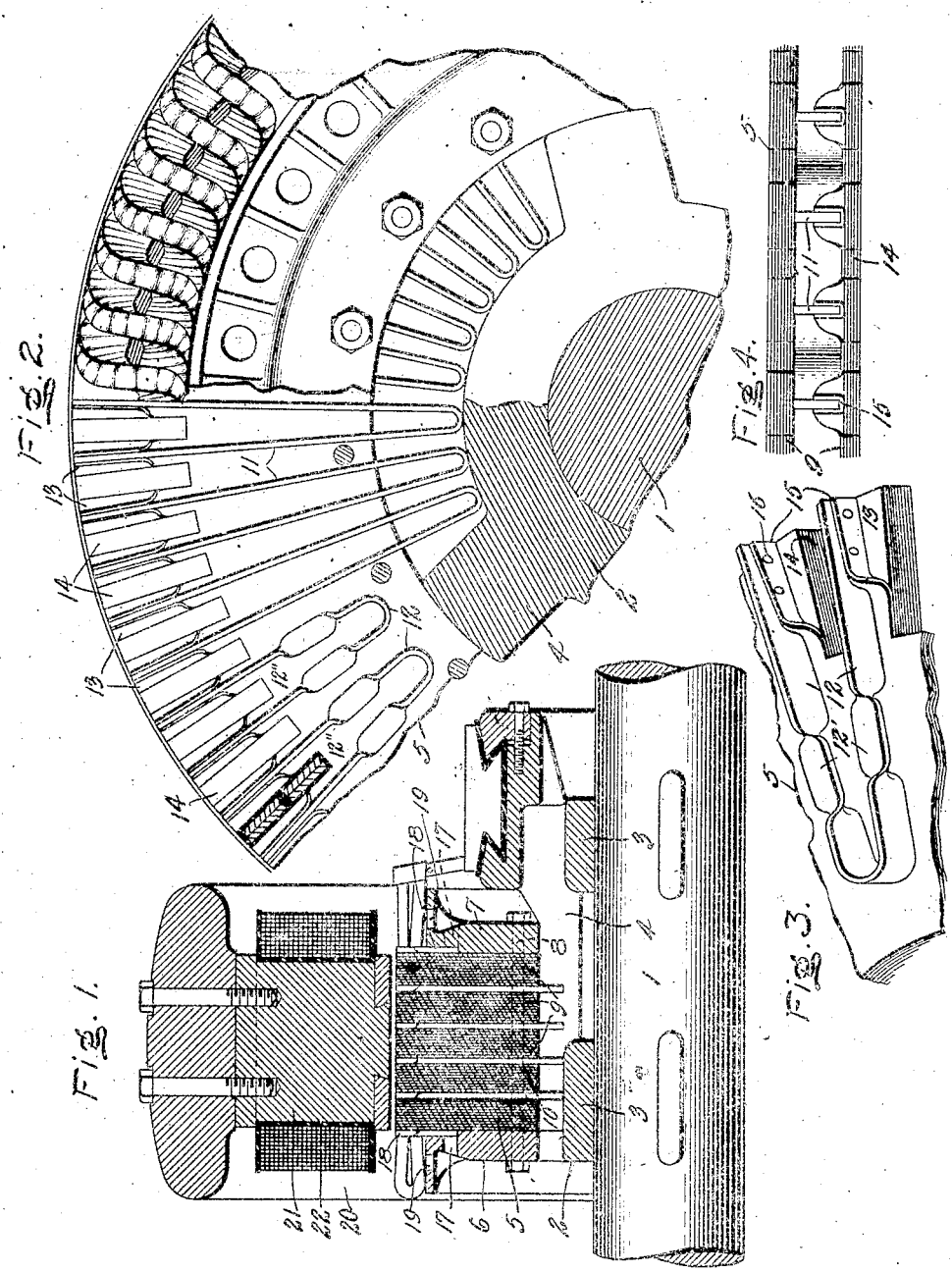

WALTER M. COFFMAN, OF MADISON, WISCONSIN, ASSIGNOR TO NORTHERN ELECTRICAL MANUFACTURING COMPANY, A CORPORATION OF WISCONSIN.

DYNAMO-ELECTRIC MACHINE.

No. 854,717.        Specification of Letters Patent.        Patented May 28, 1907.

Application filed September 5, 1905. Serial No. 276,936.

*To all whom it may concern:*

Be it known that I, WALTER M. COFFMAN, a citizen of the United States, residing at Madison, county of Dane, State of Wisconsin, have invented certain new and useful Improvements in Dynamo-Electric Machines, of which the following is a specification.

My present invention relates to the construction and arrangement of cores of magnetic material, and particularly to the construction and arrangement of the laminated cores of dynamo electric machines.

The various features of novelty which characterize my invention are pointed out with particularity in the claims annexed to and forming a part of this specification.

For a better understanding of my invention, however, reference may be had to the accompanying drawings and descriptive matter in which I have illustrated and described embodiments of my invention.

Of the drawings, Figure 1 is a side elevation with parts broken away and in section of a dynamo electric machine; Fig. 2 is an end elevation partly broken away and in section but on a larger scale of the machine shown in Fig. 1; Fig. 3 is a perspective view; and Fig. 4 a plan view illustrating details of construction.

Of the drawings, 1 represents the rotating armature shaft of a direct-current dynamo electric machine. On the shaft 1 is mounted a spider 2 which in the form shown includes collar portions 3 which surround the shaft 1 upon which they are keyed and connecting ribs or members 4. The armature core 5 of the machine, which is in the form of an annular mass of laminated material, is supported on the ribs 4, being clamped between end members 6 and 7 which are secured to the spider. The end member 7 may advantageously be formed integral with the spider. The end member 6, however, is detachable. Bolts 8 are employed to clamp the core between the end members 6 and 7.

The core proper is divided into sections 9 between which ventilating spaces 10 exist. Separators or spacers 11 and 12 are employed for spacing adjacent sections 9 apart. Each separator 11, which may be called U-shaped, has two substantially radial portions and a connecting portion, and may advantageously be formed of a doubled bar or strip of sheet metal the edges of which engage the adjacent core sections. As shown the outer free ends of each separator engage the teeth 13 of the core, preferably being arranged midway between the conductor receiving slots 14 of the core.

In order to prevent displacement of the separators 11 and 12 in assembling or afterward, the toothed portions of one of the end lamina adjacent each ventilating space are bent to form troughs 15 in which the ends of the separators are received. As additional securing means a rivet or pin 16 may be passed through each separator end and through the embracing portion of the lamina as shown in Fig. 3, though this is not usually essential.

As shown in Fig. 2 the separators 11 which are located between adjacent ribs 4 of the spider project beyond the inner surfaces of the core proper into the spaces between the ribs 4. As a result air can pass from the spaces between the ribs 4 through the spaces 10 not only through the passages between adjacent legs of adjacent separators but also between the legs of each separator.

The separators 12 which are located immediately beyond the ribs 4 are shorter than the separators 11 between the ribs. In the form shown the separators 12 beyond the ribs do not extend to the inner surface of the core proper. In the form shown each of these separators is formed with portions 12' bent at right angles to the body of the separator. This results in the formation of passages 12'' by means of which air can pass between the legs of these shortened separators.

As shown each end member is formed near its outer periphery with a groove or recess 17 adjacent the adjacent core end. Separators, spacers or supports 18 similar to the spacers 11 or 12 but usually shorter are secured to the end laminæ of the core in the same manner as the separators 11 and 12 are secured to their supporting laminæ. The yokes of these separators extend into the recesses or grooves in the end member. These separators form means for supporting the toothed portions of the laminæ at the ends of the core, thus preventing their distortion, while at the same time they do not interfere with the armature windings. Openings 19 may be formed in the end members communicating with the grooves or recesses 17 through which cooling currents of air may flow through the spaces at the sides of the legs of the separators to cool the ends of the armature conductors.

It will of course be understood that the air currents flowing through the various ventilating passages of the armature core serve not only to cool the armature and its windings but also the surrounding field magnet 20 with it poles 21 and windings 22. With the construction described a very effective circulation of air through the body of the armature core is obtained; the toothed portions of the core both at the ends of the sections and at the core proper are adequately supported, and the separators are reliably secured in place. On account of their shape they are not liable to trip or collapse under the stress of assembling or operation; each leg of each separator assisting in the support of the other.

What I claim as new, and desire to secure by Letters Patent of the United States, is,—

1. In combination, a core lamina formed with conductor receiving slots separated by teeth or projections said teeth or projections being shaped to form troughs, and separator or spacer members entering said troughs.

2. In combination, a body of magnetic material, and a spacer in the form of a bent strip or bar the ends of which engage said body, while an intermediate portion is out of engagement therewith.

3. In combination, a magnetic core comprising sections separated by spaces, and a separator or separators each in the form of a bent bar or strip the ends of which are in the space between said sections, while an intermediate portion is out of said spaces.

4. In a dynamo electric machine, a rotating spider provided with ribs extending parallel to its axis of rotation, an annular laminated core mounted on said ribs, said core being divided into sections separated by ventilating spaces, and U-shaped spacers in said spaces the legs of which are substantially radial and the yokes of which extend into the spaces between the adjacent ribs.

5. In a laminated core divided into sections separated by ventilating spaces, spacers located in said spaces, each of said spacers being formed of a strip of sheet metal the edges of which engage the end laminæ of the adjacent sections, each strip being doubled on itself and having a portion bent substantially parallel to the end laminæ to form a passage for allowing ventilation of the space between the doubled portions of said spacer.

6. In combination, a lamina, a spacer or separator coöperating therewith formed of a strip of sheet metal, doubled upon itself, a portion of said strip extending at right angles to the plane of the lamina, and another portion or portions distorted to form a passage or passages through which the space between the doubled portions of the strip may be ventilated.

7. In a dynamo electric machine, a core comprising an annular body of laminated material divided into sections separated by spaces, and separators between adjacent sections each having two substantially radial portions in said spaces and a connecting portion within the inner surface of the core proper.

8. In a dynamo electric machine, a core comprising an annular body of laminated material divided into sections separated by spaces, said body being formed with conductor receiving slots separated by teeth or projections, and separators between adjacent sections formed of U-shaped pieces of metal, the teeth or projections of one of the end laminæ of each pair of adjacent sections being bent to form troughs in which the ends of the U-shaped members are received.

In witness whereof I have hereunto set my hand this 30th day of August, 1905.

WALTER M. COFFMAN.

Witnesses:
F. HORSTMEIER.
F. M. CONLEE.